(12) United States Patent
Pallister et al.

(10) Patent No.: US 8,326,695 B2
(45) Date of Patent: *Dec. 4, 2012

(54) SYSTEM AND METHOD FOR AUTOMATED AUCTIONING OF WEB SERVICES

(75) Inventors: Kim Pallister, Beaverton, OR (US); Sandip H. Mandera, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,222

(22) Filed: May 27, 2011

(65) Prior Publication Data

US 2011/0231300 A1 Sep. 22, 2011

Related U.S. Application Data

(62) Division of application No. 11/999,463, filed on Dec. 4, 2007, now Pat. No. 7,953,646, which is a division of application No. 10/120,631, filed on Apr. 11, 2002, now Pat. No. 7,324,969.

(51) Int. Cl.
*G06Q 30/00* (2012.01)
(52) U.S. Cl. .................. 705/26.1; 707/203; 707/224
(58) Field of Classification Search ............... 705/26.1; 709/203, 224
See application file for complete search history.

(56) References Cited

U.S. PATENT DOCUMENTS

| | | | | |
|---|---|---|---|---|
| 5,758,328 A * | 5/1998 | Giovannoli | ................. | 705/26.4 |
| 6,321,207 B1 | 11/2001 | Ye | | |
| 7,039,701 B2 * | 5/2006 | Wesley | ......................... | 709/224 |
| 2002/0128934 A1 | 9/2002 | Shaer | | |
| 2003/0115128 A1 | 6/2003 | Lange et al. | | |
| 2003/0191802 A1 * | 10/2003 | Zhao et al. | ..................... | 709/203 |
| 2006/0158438 A1 | 7/2006 | Hunter | | |

* cited by examiner

*Primary Examiner* — Yogesh C Garg
(74) *Attorney, Agent, or Firm* — Pillsbury Winthrop Shaw Pittman LLP

(57) ABSTRACT

An automated auctioning system includes a customer, a web services register server (such as an Extended Markup Language (XML)-based registry server like an Universal Description, Discovery and Integration (UDDI) registry) and a number of web service providers. Automated auctioning processes of a web service desired by the customer are undertaken between the potential customer and the web service providers. The potential customer issues a bid request, and each web service provider determines whether the value of a bid in response to the bid request is below a value warranted by market demand and issues the bid if the value is higher. The potential customer assesses the bid, creating a bid assessment score. The potential customer performs an iteration on the bid assessment score using a new bid request if the score has improved since a last iteration, while engaging the web service if the score has not improved.

2 Claims, 3 Drawing Sheets

SYSTEM AND METHOD FOR AUTOMATED AUCTIONING OF WEB SERVICES

CROSS-REFERENCE TO RELATED APPLICATIONS

This application is a divisional application of U.S. patent application Ser. No. 11/999,463 filed Dec. 4, 2007, now U.S. Pat. No. 7,953,646, which is a divisional application of U.S. patent application Ser. No. 10/120,631, filed Apr. 11, 2002, now U.S. Pat. No. 7,324,969.

BACKGROUND OF THE INVENTION

1. Field of the Invention

The present invention generally relates to web services. More specifically, the present invention relates to a system, method and storage medium embodying computer-readable code for automated auctioning of web services.

2. Discussion of the Related Art

With the explosive growth of eCommerce for both business to customers and business to business (B2B), the Internet has become a new trading environment. The Internet presents extraordinary value and reach for not only ordinary everyday users, but also businesses and organizations of all sizes. With the Internet, businesses have opportunities to find customers, render services, provide information and realize great financial gains. As a result, many businesses have decisively moved their business models online, allowing them to increase revenue, lower cost, access, and interact with a broad range of customers, process transactions, create new marketing strategies and/or provide new lines of customer service.

To participate in this digital economy, a business must first set up a web site or a portal that allows users to interact with information and/or services provided by the business via the Internet. Within the web site, most businesses likely need to set up a number of sophisticated functionalities, such as credit card processing and security capability. A business that already has a web site may also want to improve or modify its web site from time to time by changing functionality on the web site. The functionality is usually achieved by running eCommerce-enabling applications and web services. For example, a developer of an investment advisement web site may choose to use a first eCommerce-enabling application and/or a first web service from a third party provider for real-time stock quotes. The developer may use a second eCommerce-enabling application and/or a second web service from a credit card processing company to the bill investment company's clients. This way, the developer needs only to provide his/her unique information and knowledge, while outsourcing the rest of the investment advisement web site's functionality to providers of the eCommerce-enabling applications and web services. In return, the providers are compensated for the service/functionality they provide.

An issue that exists with web services is that in order for a business to create a custom solution, such as the above investment advisement web site example, and employ different web services, the business must find services that fit the bill for the problem at hand. The business basically needs a mechanism to find the locations on the Internet that offer web services and learn the capabilities offered by those services. When a business finds the web services and understands their capabilities, normal progression would require the business to provide, and its potential customer to demand receiving, web services that automatically tailor to both of their offerings, requirements, pricing, etc. However, this accommodation is not achievable under the current protocols of providing web services.

At first, there was no central way to easily get information about the web services available on the Internet, and then access them. However, several standards/mechanisms have been developed recently, and they offer protocols for the listing of web services. One example of such standards is the Universal Description, Discovery and Integration (UDDI) specification (UDDI Technical White Paper, dated Sep. 6, 2000, from Ariba, Inc., IBM, and Microsoft). UDDI lists available services registered within the UDDI registries and allows a company that wishes to create a custom solution using web services to bind several web services residing in a distributed environment. Under existing schemes of the current protocols and registry/listing servers, like the UDDI, a potential customer looking for a web service offered by a web service provider goes to the registry service, retrieves a list of available services, selects one that best meets the potential customer's technical and cost requirements, and attempts to use the service. However, because web service providers are forced to hardcode their listings with the Extended Markup Language (XML)-based registries/listing servers like UDDI, and/or the current protocols, several problems result. First, web service providers are not able to offer different prices to different customers automatically. Second, web service providers are not able to offer any kind of price/volume sliding scale pricing schemes automatically. Third, web service providers are not able to offer varying levels of service quality at different prices automatically. Fourth, potential customers are not able to make counter-offers to prices suggested by web service providers automatically. Finally, potential customers are unable to ask for "less than premium" or minimum required services at lesser prices automatically.

The inability for the current solution to automatically perform any of the above acts means that the web service provider and the potential customer are not attaining the optimal return/value for a given supply and demand of the product. Therefore, there is a need for a new system and method of providing automated auctioning of web services that achieve optimal return/value for a given supply and demand of the product.

BRIEF DESCRIPTION OF THE DRAWINGS

The accompanying drawings, which are incorporated in and form a part of this specification, illustrate embodiments of the present invention and, together with the description, serve to explain the principles of the present invention.

DETAILED DESCRIPTION

Figure 1:
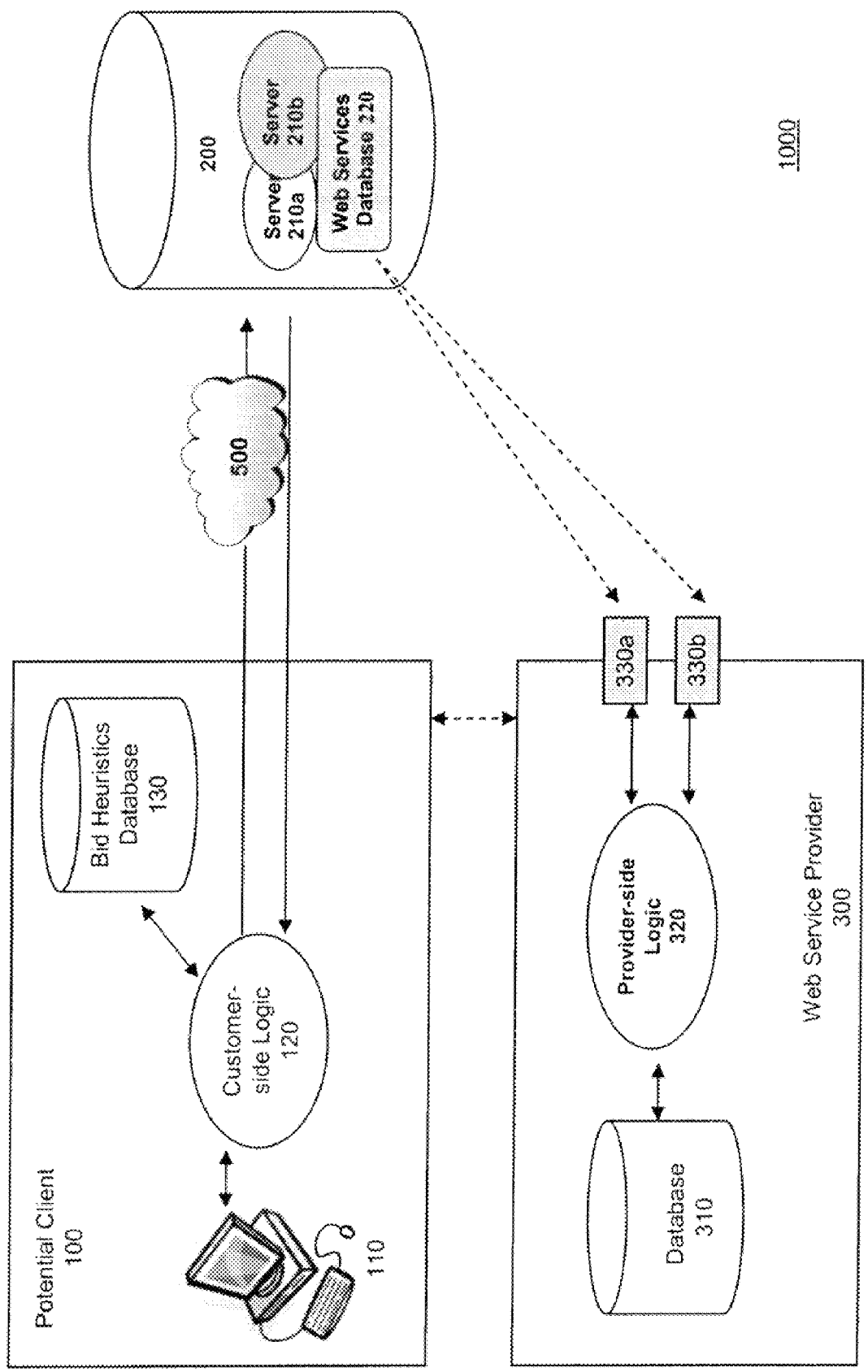
FIG. 1 shows an exemplary system in which embodiments of the present invention may function.

Reference will now be made to the preferred embodiments of the invention, examples of which are illustrated in the accompanying drawings. While the present invention will be described in conjunction with the preferred embodiments, it will be understood that they are not intended to limit the invention to these embodiments. On the contrary, the present invention is intended to cover alternatives, modifications and equivalents, which may be included within the spirit and scope of the invention as defined by the appended claims. Moreover, in the following detailed description of the present invention, numerous specific details are set forth in order to provide a thorough understanding of the present invention. However, the present invention may be practiced without these specific details. In other instances, well-known methods, procedures and components have not been described in detail as not to unnecessarily obscure aspects of the present invention.

Embodiments of the present invention are directed to a system, method and storage media embodying computer-readable codes for providing automated auctioning of web services, in which optimal return/value for a given supply and demand of a web service is achieved by both a web service provider and a potential customer. In one embodiment, a network is provided to connect a number of potential customers with a number of web service providers. Each potential customer may request web services from any of these web service providers, and can integrate the web services with its own web site, if need be. Web services may, for example, describe specific business functionality exposed by a company, usually through an Internet connection, for the purpose of providing a way for another company or software program to use the services. Web services may be considered as programmatic components/elements that can be published, discovered and/or invoked over the network using open, interoperable protocols. With the web services from various web service providers integrated and/or placed on its web site, a potential customer is able to develop custom Internet applications and web sites that utilize one or more components running on remote machines to provide solutions tailored to a particular problem or need. The potential customer then in turn may provide services, through web services, to clients of the potential customer.

In one implementation, standardized methods, heuristics, and/or algorithms are employed to allow the web service providers and the potential customers to engage in an automated auction type process to buy and sell web services. This allows for, among other advantages, web service providers to realize maximum revenue, potential customers to receive maximum value, and/or web service providers to have better load balancing. Using this design approach, optimal return/value for a given supply and demand of a web service is achieved from both the perspectives of the buy-side and sell-side of a web service. Therefore, a potential customer is able to develop a custom Internet application/solution using web services that tailor to his/her requirements, needs and pricing, while a web service provider is able to achieve maximum revenue potential and load balance.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" or "according to an embodiment" appearing in various places throughout the specification are not necessarily all referring to the same embodiment.

FIG. 1 shows a general system in which embodiments of the present invention may operate. The general system 1000 comprises a potential customer 100, a UDDI registry server 200 and a web service provider 300. Although only one potential customer and one web service provider are shown in FIG. 1, it is noted that there are usually more than one potential customer, and each potential customer usually interacts with a number of web service providers in order to choose a web service that best fits the potential customer's criteria. However, for simplicity, only the potential customer 100 and the web service provider 300 are illustrated. In this example, the potential customer 100 wishes to determine if the web service provided by the web service provider 300 fits the initial criteria of the potential customer 100. If it does, the web service provided by the web service provider 300 is compared to web service(s) provided by the other web service providers (not shown), and an automated auctioning mechanism is performed between the potential customer 100 and the web service providers to yield a web service with optimal price for a given supply and demand of the web service.

In one embodiment, the potential customer 100, the web services directory server 200 and the web service provider 300 are connected together via the Internet/World Wide Web 500. In order for the potential customer 100 to interact with the web service provider 300, the potential customer must first find the web service provider 300. Usually, this task is done by the potential customer 100 querying the UDDI registry server 200, which contains information about web services in general. Once the potential customer 100 finds the web service provider 300 and other web service providers (not shown) that offer the desired web service, the potential customer 100 decides which web service provider to employ. Communications between any two of the potential customer 100, UDDI registry server 200 and web service provider 300 may be wire-based or wireless-based. There may be a direct interaction between the potential customer 100 and the web service provider 300; however, there may also be an indirect interaction, as UDDI registry server 200 relays information from one to another.

According to an embodiment of the present invention, the UDDI registry server 200 includes communication servers 210a, 210b and a web services database 220 for the web service listing. The communication servers 210a, 210b may, for example, be a Simple Object Access Protocol (SOAP) server and a Hypertext Transport Protocol (HTTP) server, respectively. In one embodiment, the UDDI registry server 200 is based on UDDI, which include specifications for distributed web-based information registries of web services that define a way to publish and discover information about web services. The UDDI registry server 200 may use standards-based technologies, such as Transmission Control Protocol/Internet Protocol (TCPIP), HTTP, Extensible Markup Language (XML) and SOAP to create a uniform service description format and service discovery protocol. These protocols are also used for web services to communicate with each other. For example, SOAP requests and responses may be sent between the potential customer 100 and the web services directory server 200. It is noted that the present invention, being protocol agnostic, does not dictate that a particular protocol be used.

In one implementation, the web services database 220 for the web service listing is expanded to comprise numerous fields. The exact number and nature of fields vary according to the web service to be employed. For example, using the stock quote service example discussed above, the stock quote service would have a description such as that used by a UDDI registry. The description further includes the following exemplary fields: regular service usage price, limited service usage price, bulk discount threshold, regular percentage discount rate, and limited percentage discount rate. The regular service and limited usage prices may, for example, be on a per usage basis or multiple usage basis. The limited service usage price is the lowest price the web service provider is willing to offer if there is a lack of demand. The bulk discount threshold dictates how many transactions per day to get the discount rate. The regular percentage discount rate decides the discount being offered if the bulk discount threshold is exceeded. The limited percentage discount rate is the maximum discount the web service provider is willing to offer. It is noted that the fields noted above are only for illustrative purposes. The types of fields originally stored in the database 220 vary from application to application, and in particular, depend upon the business domain, the type of web services, a particular company's business and operational criteria and/or other factors. In other embodiments, objects, flat files, or any other storage mechanism having a variety of data structures may be used in place of and/or in conjunction with the fields.

According to an embodiment of the present invention, each of the fields may, for example, include a value and/or a weight, which may indicate how important an item/criterion/requirement described in a field is to a web service provider and/or a potential customer. A "weight" may represent what a business would assign to a particular criterion, and the criterion would have a data that is called "value." Automatic auctioning of web services is accomplished in part by the manipulation of the weight, the value and, in some instance, parameters tracked by the web service provider 300 and parameters given by the potential customer 100.

On the customer's side, the potential customer 100 comprises a user interface 110, customer-side logic 120, and a bid heuristics database 130. The user interface 110 may, for example, be in the form of a server, a workstation, a computer system, or an input terminal/device. The user interface 110 allows the operator of the potential customer/client 100 to input information and input requests to the UDDI registry server 200 and the web service provider 300, as well as receive requests and review information received from the UDDI registry server 200 and the web service provider 300. For example, the potential customer 100 is able to have a profile of the web service required inputted to the UDDI registry server 200 through the user interface 110. In return, the potential customer 100 receives a list of web service providers matching the profile, which includes the web service provider 300 under this example. The potential customer 100 also needs the user interface 110 to interact with the web service provider 300, such as during the process of employing the web service provided by the web service provider 300.

Through the user interface 110, the potential customer 100 is also able to enter a number of parameters/criteria to be evaluated in the automated auctioning process. Parameters/criteria may also be stored in the bid heuristics database 130 and/or provided from the UDDI registry server 200, such as the service type and other properties already proposed in schemes such as UDDI. For example, in the above stock quote service example, the potential customer 100 may decide to track the following parameters/criteria: expected capacity (e.g., how many transactions will the potential customer 100 need), best price found so far, and maximum price limit. In the embodiment, the bid heuristic database 130 also includes heuristics that utilizes experimental, especially trial-and-error methods to enable the potential customer 100 to obtain a web service(s) that is more tailored to the customer's needs and that has the best price as per market supply and demand. In one embodiment, the potential customer 100 submits bid requests to all web service providers on the list of web service providers matching the profile. If a web service provider decides to submit a bid, the bid is collected. Using the customer-side logic 120 and the bid heuristics database 130, the bids are assessed and new bid requests may be iteratively performed to achieve the best price for the customer.

The web service provider 300 comprises a database 310, provider-side logic 320 and web service interfaces 330*a*, 330*b*. Although only one database and only two web service interfaces are shown in FIG. 1, it is noted that a multiple number of databases or web service interfaces may be employed by the web service provider 300. In one embodiment, the web service provider 300 tracks a weight for the fields of a particular web service, e.g., the stock quote service example above. The web service provider 300 sets the weight of the fields in the database 310 to determine which of the factors are most important for its business. The web service provider 300 also tracks a number of other parameters on the servers that provide the web service(s) and stores them in the database 310. For example, a web service provider may decide to set the aforementioned limit percentage discount rate field, or the bulk discount, at the value of a 40% discount rate, while using a weight of 0.35 to represent its importance among the other fields. A number of variables/parameters may also be tracked, and in the stock quote service example, the parameters include a current transaction rate, maximum transaction rate and current price offered to previous customer(s). The current transaction rate includes the number of transactions per time period. The maximum transaction rate is used with the current transaction rate to determine the percentage of maximum capacity. In operation, the web service provider 300 may, for example, use its leftover bandwidth for other purposes, so running at capacity is not important. Accordingly, the weight for the field(s) related to bandwidth is set to low. On the other hand, another web service provider may decide that running at capacity is more important than always achieving top selling price. Each web service provider may have a separate criterion or a few criteria that it deems more important, to which the web service provider assigns higher weight.

When the web service provider 300 receives a bid request from the potential customer 100, it uses the information in the bid request and information stored in the database 310 to determine if a bid is to be assembled and issued. Specifically, the weight and value of the fields, along with parameters tracked by the web service provider 300, are utilized in determining whether a bid is to be assembled. If the web service provider 300 decides to issue a bid to the potential customer 100 and the bid is accepted, then the web service is engaged through one of the web service interfaces 330*a*, 330*b*. On the other hand, if the bid is rejected, then the bid assessment process and the bid assembling process are repeated with lower criteria at each iteration. The interactions among the database 310, the provider-side logic 320 and the potential customer 100 allow the web service provider to obtain maximum revenue potential by adjusting pricing and other offerings according to supply and demand, peak times, etc. Thus, both the potential customer 100 and the web service provider 200 are offered the best alternative based on a variety of heuristics.

Figure 2:
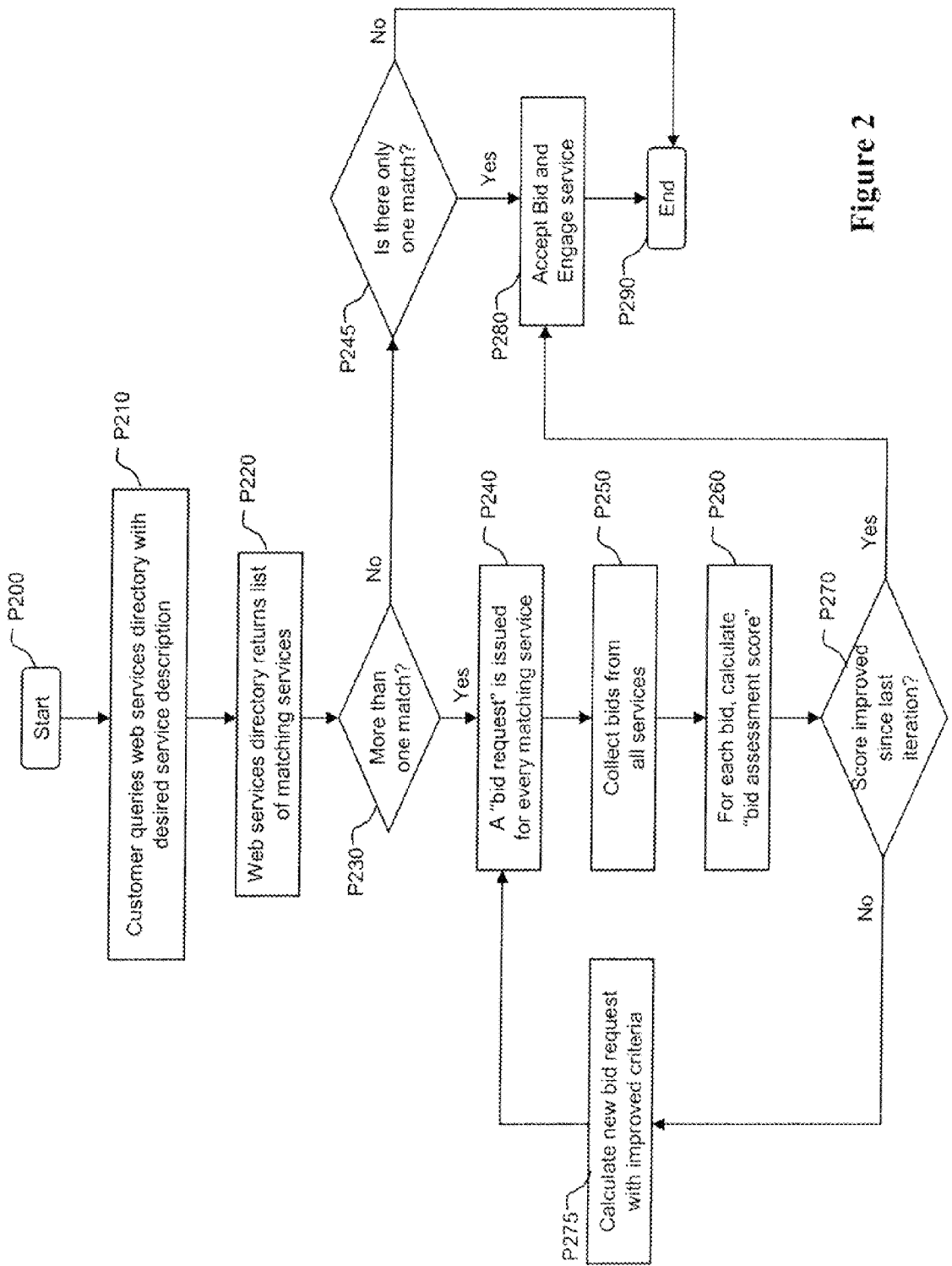
FIG. 2 illustrates processes for providing automated auctioning of web services at a customer's side according to an embodiment of the present invention.

FIG. 2 illustrates processes for providing automated auctioning of web services at a customer's side according to an embodiment of the present invention. In block P200, the automated auctioning of web services is initiated by the potential customer 100. The potential customer 100 queries the UDDI registry server 200 with the type of web service in which the customer 100 is interested, as shown in block P210. In one implementation, a profile of the web service required or the desired web service description is used for the query. In block P220, the UDDI registry server 200 returns a list of web service providers matching the profile/description. In one embodiment, the customer 100 is given the option to resubmit the query with a more restrictive or a more broad profile, especially if the list is too long or too short. The customer 100 may also be allowed to edit the list once it is returned to deselect certain web service providers or add certain web service providers.

In block P230, it is determined whether there is more than one web service provider matching the description of the requested profile. If there is more than one match, the process proceeds. Otherwise, the service is engaged, as shown in block P280. In one embodiment, the potential customer 100 is allowed to choose whether or not to engage the service when there is only one match. The process ends in block P290 for the scenario of one or more matches or no match.

In block P240, assuming that multiple web service providers match the profile, a list of these web service providers is provided, and a "bid request" is assembled and issued to all entries on the list. In one embodiment, the format of the bid request may be a SOAP request over HTTP, or a SOAP request via Simple Mail Transfer Protocol (SMTP). In block P250, all bids from the web service providers are collected by the potential customer 100 within a predetermined period of time. In block P260, the bids are assessed to rate them according to a customer needs profile to create a bid assessment score. Based on the customer's needs, the bid assessment score is computed to determine what is the most important for the customer. For example, one customer might deem price and accuracy to be vital, while another might think reliability and security are more important. For each bid, the potential customer 100 is able to compute a bid assessment score based on the bid issued by a particular web service provider and its needs. The bid assessment scores for each bid are compared with one another, and the web service provider with the best score is deemed to be the most optimum web service provider for this round of bid assessment. Iteration is then performed on the bid request process and the bid assessment process, using the best bid assessment score as a reference.

In block P270, it is determined whether the best bid assessment score has improved since the last iteration. If the score has improved, then the potential customer 100 will accept the big and engage with the services as in block P280. If the bid assessment score has improved, iteration is performed continuously to try and see if a better bid assessment score can be achieved. In this case, blocks P240-P270 are repeated with a new bid request derived from improved criteria. If no previous best bid assessment score exists in the first iteration, the potential customer 100 does not engage with a web service provider upon receiving the bids for the first time (assuming there are more than one web service provider matching the profile). Instead, the potential customer 100 calculates a new bid request with improved criterion or improved criteria, as shown in block P275. As mentioned, the potential customer 100 also calculates a new bid request with improved criteria if the best bid assessment score has improved. Examples of improving criteria are lowering the price offering and increasing the expected capacity. In one embodiment, the criteria are improved automatically. The customer-side logic 120 and bid heuristics database 130 work together to employ heuristics in which more stringent criteria are employed at the first iteration, and lesser and lesser stringent criteria are employed at later iterations. For example, a potential customer may wish to get the best deal, in which the most stringent criteria are used in the first bid request evaluation. When the potential customer receives a low response, based on heuristics stored in the bid heuristic database 130, the customer-side logic 120 evaluates the current bid with the bid heuristic database 130 to check for preferences. Based on the enhanced criteria, the bid requests are re-submitted to the web service providers.

After at least two iterations, if the best bid assessment score does not improve since the last iteration, then the web service with the best bid assessment score from the last iteration is identified as the one that best fits the customer's needs. In this case, the potential customer 100 accepts bid and engages service, as shown in block P280. In one embodiment, the potential customer 100 retrieves the address of the web service and binds the customer to the needed web service. In one embodiment, the web service is downloaded onto the customer's platform. In another embodiment, the web service serves the customer remotely through a one-way request. The process at the customer's side ends in block P290.

Figure 3:
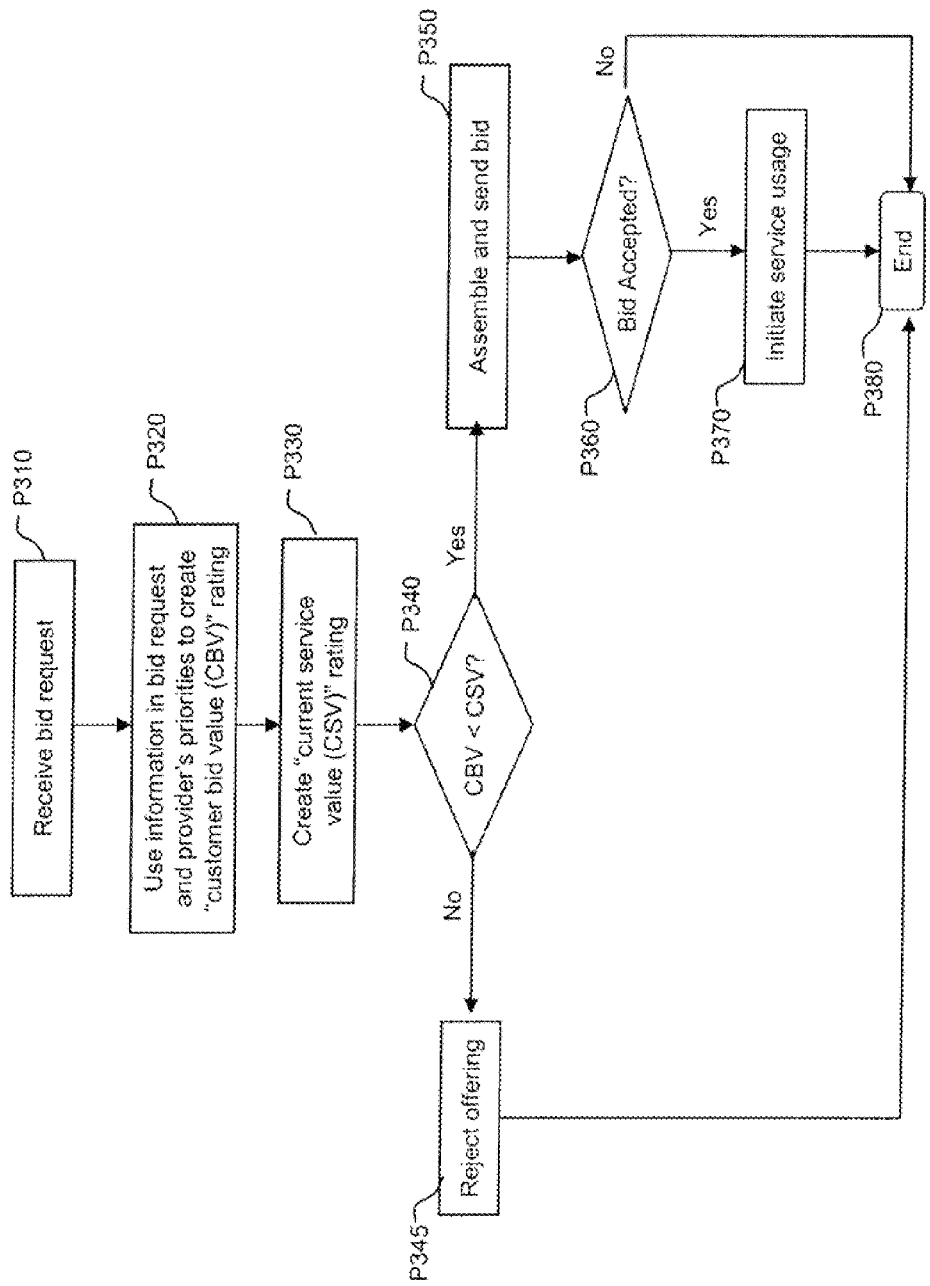
FIG. 3 illustrates processes for providing automated auctioning of web services at a web service provider's side according to an embodiment of the present invention.

FIG. 3 illustrates processes for providing automated auctioning of web services at a web service provider's side according to an embodiment of the present invention. The process of automated auctioning of web services at a web service provider's side is initiated in block P310 when the web service provider receives a bid request from a potential customer. In block P320, the web service provider uses information in the bid request, along with information about the web service provider's priorities, to create a "customer bid value" (CBV) rating. In one embodiment, the web service provider's priorities depend on the weight and value that the web service provider assigned to the fields of a particular web service type. The priorities may also depend on parameters on the servers that the web service provider is tracking. The CBV indicates the value of the customer's bid request in light of the web service provider's priorities. In block P330, the web service provider determines the current value of the web service that the customer has issued a bid request, or the value of what market demand warrants. In one embodiment, the web service provider uses information about its current available bandwidth, capacity, current going price, etc., to create a "current service value" (CSV) rating. Although it is shown that CSV is calculated after the CBV, it is noted that the sequence of their calculations is not important.

In block P340, it is determined whether the CBV is less than CSV, i.e., whether the current value of the web service as determined by the web service provider is greater than the value of the customer's bid request value in light of the web service provider's priorities. If the CBV is greater than the CSV, signaling that the bid is too far below what market demand warrants, then the customer's bid request or offering is rejected in block P345. The process then ends in block P380. On the other hand, if the CBV is less than the CSV, then a bid is assembled and issued to the customer in block P350. In one embodiment, the bid is assembled using the CSV, CBV, and information in the bid request. Each business may uniquely derive their own decision system and assemble the bid differently depending on the nature of the web service. After the bid has been sent to the customer, the web service provider waits for a signal from the customer that indicates the bid has been accepted. In block P360, it is determined whether the bid is accepted or rejected by the customer. If the bid is accepted, then the web service is engaged in block P370 and the process ends in block P380. In one embodiment, the engagement is achieved by having the customer retrieve the address of the web service and bind it to the needed web service. On the other hand, if the bid is rejected, the process goes directly to block P380 and ends, skipping block P370. At this point, the web service provider awaits a new bid request from the same customer with an improved criteria. When a new bid request is received, the process of providing automated auctioning of web services at a web service provider's side is repeated.

Many advantages are intrinsic to the present invention of providing automated auctioning of web services. First, customers receive web services more tailored to their needs, trading off price for response time. Second, a customer is able to obtain the best price for a given supply and demand of a web service desired by the customer. Third, service providers get maximum revenue potential through adjusting pricing and other offerings, taking into consideration the supply/demand, peak/non-peak times, discount rate, etc. Fourth, service providers achieve "load balance" by, for example, offering web services at discounted rates during non-peak times. Finally, by offering web services that can automatically tailor their offerings/requirements/pricing, the present invention makes a wider variety of offerings available to customers and eventually to end-users.

Although the stock quote service is used primarily to illustrate embodiments of the present invention, it is noted that other types of web services may also serve as the programmatic backbone for electronic commerce. For example, a potential customer may call another's web service to send a purchase order directly via an Internet connection. Another example is a web service that calculates the cost of shipping a package of a certain size and/or weight over a certain number of miles. Yet another example is a web service from a credit card processing web service provider that processes credit card orders. Airline reservation services and checking account services are also examples of commonly employed web services. The type of web services to be employed depends on the situation at hand and requirements of a potential customer. Examples of web services may be related to any one of web-based B2B eCommerce, electronic sales, online auctions, dynamic electronic marketplaces, and applications that process, secure and route information. The present invention applies regardless of the different types of web services.

While the foregoing description refers to particular embodiments of the present invention, it will be understood that the particular embodiments have been presented for purposes of illustration and description. They are not intended to be exhaustive or to limit the invention to the precise forms disclosed. Many modifications and variations are possible in light of the above teachings and may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automated auctioning system for providing automated auctioning of a service, the automated auctioning system comprising:
    a database to store records including information about services provided by a web service provider;
    a computer, coupled to the database, and including software, which when executed by a processor in the computer, causes the computer to request a list of web service providers matching a profile, to receive a list of a plurality of web service providers matching the requested profile of a web service, to issue a first bid request to each entry on the list of the plurality of web service providers, and to collect bids from the web service providers based on the first bid request; to assess the bids according to customer needs stored in records in the database to create bid assessment score for each of the plurality of web service providers, the bid assessment scores calculated based on at least two of reliability, security and accuracy of the web service providers bid; and to select a web service provider with a highest bid assessment score.

2. An automated web service provider, computer, comprising:
    a database to store records including information about services provided by a web service provider;
    a computer, coupled to the database and including software, which when executed by a processor in the computer causes the computer to:
    receive a bid request for a service from a client computer;
    create a customer bid value rating utilizing the database that is based on information in the bid request;
    create a current service value utilizing the database that represents a market demand of a bid in response to the bid request,
    determine if a bid is to be generated based on a comparison of the customer bid value and the current service value;
    if the customer bid value is above the current service value, causes the automated web service provider computer to transmit the bid value to the client computer; and
    if the customer bid value is below or equal to the current service value, causes the automated web service provider to reject the corresponding bid.

* * * * *